US006532349B1

(12) United States Patent
Todome

(10) Patent No.: US 6,532,349 B1
(45) Date of Patent: Mar. 11, 2003

(54) IMAGE READING-OUT APPARATUS

(75) Inventor: Tsuyoshi Todome, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/713,006

(22) Filed: Nov. 16, 2000

(51) Int. Cl.⁷ .............................................. G03G 15/00
(52) U.S. Cl. ......................................... 399/81; 399/377
(58) Field of Search ........................ 399/81, 182, 185, 399/367, 377, 379, 380, 107, 125

(56) References Cited

U.S. PATENT DOCUMENTS

| | | | | |
|---|---|---|---|---|
| 4,812,874 A | * | 3/1989 | Kubota et al. | 399/185 |
| 4,829,341 A | * | 5/1989 | Sasaki et al. | 399/377 X |
| 4,870,458 A | * | 9/1989 | Shibuya et al. | 399/185 |
| 4,996,561 A | * | 2/1991 | Yoshimura et al. | 399/107 |
| 6,163,668 A | * | 12/2000 | Takahashi et al. | 399/377 X |
| 6,259,866 B1 | * | 7/2001 | Kabumoto et al. | 399/81 X |

FOREIGN PATENT DOCUMENTS

| | | | |
|---|---|---|---|
| JP | 5-204058 | * | 8/1993 |
| JP | 5-341605 | | 12/1993 |

* cited by examiner

Primary Examiner—Sandra Brase
(74) Attorney, Agent, or Firm—Foley & Lardner

(57) ABSTRACT

An image reading-out apparatus provided at least with a document table made of a transparent material that passes an image reading light beam and having a flat surface on which a document can be set and a cover that presses the document set on the document table and prevents the image reading light beam from leakage includes a display/edition unit. The display/edition unit has a display section having a large area for displaying an image that has been read-out via the image reading light beam and an edition-operation menu for the image, a command entering section for entering an edition operation command by a touch to the read-out image displayed on the display unit, and a control section that controls displaying of the read-out image and the edition operation command and entering of the edition operation command by a touch. The display/edition unit is provided at a position so as not to obstruct the cover from depressing the document and preventing the image reading light beam from leakage.

16 Claims, 11 Drawing Sheets

IMAGE READING-OUT APPARATUS

BACKGROUND OF THE INVENTION

The present invention relates to an image reading-out apparatus, such as a copy machine and a scanner, having a large liquid-crystal display, forming an entering operation displaying section and a read-out image processing section, that can be set in a prominent position for an operator.

A well-known image reading-out apparatus, a copy machine, etc., has a document table such as a transparent glass board set on a box-like main body and a cover set over the document table, almost the same size as the table, for pressing a document that has been set on the document table towards the table and preventing leakage of a reading light beam to upwards. Provided around the document table and cover is an entering operation unit for an input operation to a fax machine and a display unit such as a small liquid-crystal display.

A well-known image reading-out apparatus has a small liquid-crystal display for an entering operation or displaying as described above. Such a small liquid-crystal display, however, cannot display large items due to a limited displaying area, thus having difficulty in understanding displayed items and operation items for an operator to operate.

A small liquid-crystal display used for a multifunctional or sophisticated copy machine also cannot simultaneously display several function items. An operator selects selection buttons that appear on the display one after another while the displayed menu is changing to access to a desired function, thus generating complicated multi-windows. When an image is displayed on a small liquid-crystal display after several times of menu changing, an operator himself or herself sometimes has difficulty in knowing that the image displayed now belongs to which window, thus causing difficulty in operation.

Processing an image read out by an image reading-out apparatus such as a scanner is usually performed by reading a document set on a digitizer and entering positions to be edited via a point entering means directly on the document. The positions to be edited and entered via the point entering means are directed onto the document actually set on the digitizer.

Image edition via this type of read-out image processing unit sometimes causes positional displacement between the positions directed on an actual document and those on an image on screen, which further causes positional displacement between the positions directed on the document and those on an image printed on an image forming medium such as a sheet of paper. This is caused by positional displacement that occurs when the image has been read out and is copied during edition.

SUMMARY OF THE INVENTION

A purpose of the present invention is, in order to solve the above problems, to provide an image reading-out apparatus that is easy to operate and view by providing a large display unit on a cover of a document table that is easy to view for an operator and has a large area or on an automatic document feeding mechanism provided with the cover, capable of parallel displaying of operation menus and displaying of a large edition window for processing an image read out by a scanner, etc.

To achieve the above purpose, an image reading-out apparatus according to a basic structure of the present invention is provided at least with a document table made of a transparent material that passes an image reading light beam and having a flat surface on which a document can be set and a cover that presses the document set on the document table and prevents the image reading light beam from leakage, the apparatus including a display/edition unit that has: a display section having a large area for displaying an image that has been read-out via the image reading light beam and an edition-operation menu for the image; a command entering section for entering an edition operation command by a touch to the read-out image displayed on the display unit; and a control section that controls displaying of the read-out image and the edition operation command and entering of the edition operation command by a touch, the display/edition unit being provided at a position so as not to obstruct the cover from depressing the document and preventing the image reading light beam from leakage.

It is preferable for an image reading-out apparatus according to the first aspect of the present invention, in the image reading-out apparatus according to the basic structure, that the display/edition unit is shaped in a rectangle to cover a glass board that forms the document table set on an image forming apparatus and is formed of a flat cover that is hinged on one upper leg of the rectangle, the display unit being constructed of a large liquid-crystal display screen set on the cover, and the command enter unit being constructed of a touch panel set on the large liquid-crystal display screen.

In the image reading-out apparatus according to the first aspect of the present invention, the display/edition unit may have a protector that protects a surface of the large liquid-crystal display screen and has an open/close function of shielding or opening the large liquid-crystal display screen according to need.

In the image reading-out apparatus according to the above structure, the protector may be formed of an endless belt having a shield portion for obstructing light from passing therethrough, a positioning portion engaged with an edge and another edge of the touch panel to restrict an open state and a shield state, and an opening portion larger than the large liquid-crystal display screen, the protector being set between a first and a second roller, an output shaft of a drive motor being fixed at one of the rollers to rotate with the roller.

The image reading-out apparatus according to the above structure may further include an open/close switch provided along the large liquid-crystal display screen, for switching the protector to open or close. In the structure, the open/close switch may be used as a switch for power-on or -off for the large liquid-crystal display screen and the touch panel.

In the image reading-out apparatus according to the first aspect of the present invention, the large liquid-crystal display screen having the touch panel may have a slant angle adjustment mechanism having a rotary supporting shaft for supporting both edges of a leg of the large liquid-crystal display screen, an elliptic cam provided rear side of another leg against the one leg at which the rotary supporting shaft is attached and an angle adjustment dial fixed at a rotary shaft for rotating the elliptic cam, for adjusting the elliptic cam while rotating.

It is preferable for an image reading-out apparatus according to the second aspect of the present invention, in the image reading-out apparatus according to the basic structure, that the display/edition unit is constructed of an automatic document feeding mechanism shaped in a rectangle to cover a glass board that forms the document table set on an image forming apparatus and hinged on one upper leg of the rectangle and having an upper document feeding tray and a lower document discharging tray, the display unit being constructed of a large liquid-crystal display screen set at a lower stage of the automatic document feeding mechanism, and the command enter unit being constructed of a touch panel set on the large liquid-crystal display screen.

In the image reading-out apparatus according to the second aspect of the present invention, the display/edition unit may have a protector that protects a surface of the large liquid-crystal display screen and has an open/close function of shielding or opening the large liquid-crystal display screen according to need.

In the above structure, the protector may be formed of an endless belt having a shield portion for obstructing light from passing therethrough, a positioning portion engaged with an edge and another edge of the touch panel to restrict an open state and a shield state, and an opening portion larger than the large liquid-crystal display screen, the protector being set between a first and a second roller, an output shaft of a drive motor being fixed at one of the rollers to rotate with the roller.

In the above structure, the image reading-out apparatus may further have an open/close switch provided along the large liquid-crystal display screen, for switching the protector to open or close. Moreover, the open/close switch may also be used as a switch for power-on or -off for the large liquid-crystal display screen and the touch panel.

In the image reading-out apparatus according to the above passing therethrough, a positioning portion engaged with an edge and another edge of the touch panel to restrict an open state and a shield state, and an opening portion larger than the large liquid-crystal display screen, the protector being set between a first and a second roller, an output shaft of a drive motor being fixed at one of the rollers to rotate with the roller.

In the above structure, the image reading-out apparatus may further have an open/close switch provided along the large liquid-crystal display screen, for switching the protector to open or close. Moreover, in the structure, the open/close switch may also be used as a switch for power-on or -off for the large liquid-crystal display screen and the touch panel.

In the image reading-out apparatus according to the third aspect of the present invention, the large liquid-crystal display screen having the touch panel may have a slant angle adjustment mechanism having a rotary supporting shaft for supporting both edges of a leg of the large liquid-crystal display screen, an elliptic cam provided rear side of another leg against the one leg at which the rotary supporting shaft is attached and an angle adjustment dial fixed at a rotary shaft for rotating the elliptic cam, for adjusting the elliptic cam while rotating.

In the image reading-out apparatus according to the second aspect, the large liquid-crystal display screen having the touch panel may have a slant angle adjustment mechanism having a rotary supporting shaft for supporting both edges of a leg of the large liquid-crystal display screen, an elliptic cam provided rear side of another leg against the one leg at which the rotary supporting shaft is attached and an angle adjustment dial fixed at a rotary shaft for rotating the elliptic cam, for adjusting the elliptic cam while rotating.

It is preferable for an image reading-out apparatus according to the third aspect of the present invention, in the image reading-out apparatus according to the basic structure, that the display/edition unit is constructed of an automatic document feeding mechanism shaped in a rectangle to cover a glass board that forms the document table set on an image forming apparatus and hinged on one upper leg of the rectangle and having an upper document feeding tray and a lower document discharging tray, the display unit being constructed of a large liquid-crystal display screen set at an upper stage of the automatic document feeding mechanism, and the command enter unit being constructed of a touch panel set on the large liquid-crystal display screen.

In the image reading-out apparatus according to the third aspect of the present invention, the display/edition unit may have a protector that protects a surface of the large liquid-crystal display screen and has an open/close function of shielding or opening the large liquid-crystal display screen according to need.

In the above structure, the protector may be formed of an endless belt having a shield portion for obstructing light from

DETAILED DESCRIPTION OF PREFERRED EMBODIMENTS

Figure 1:
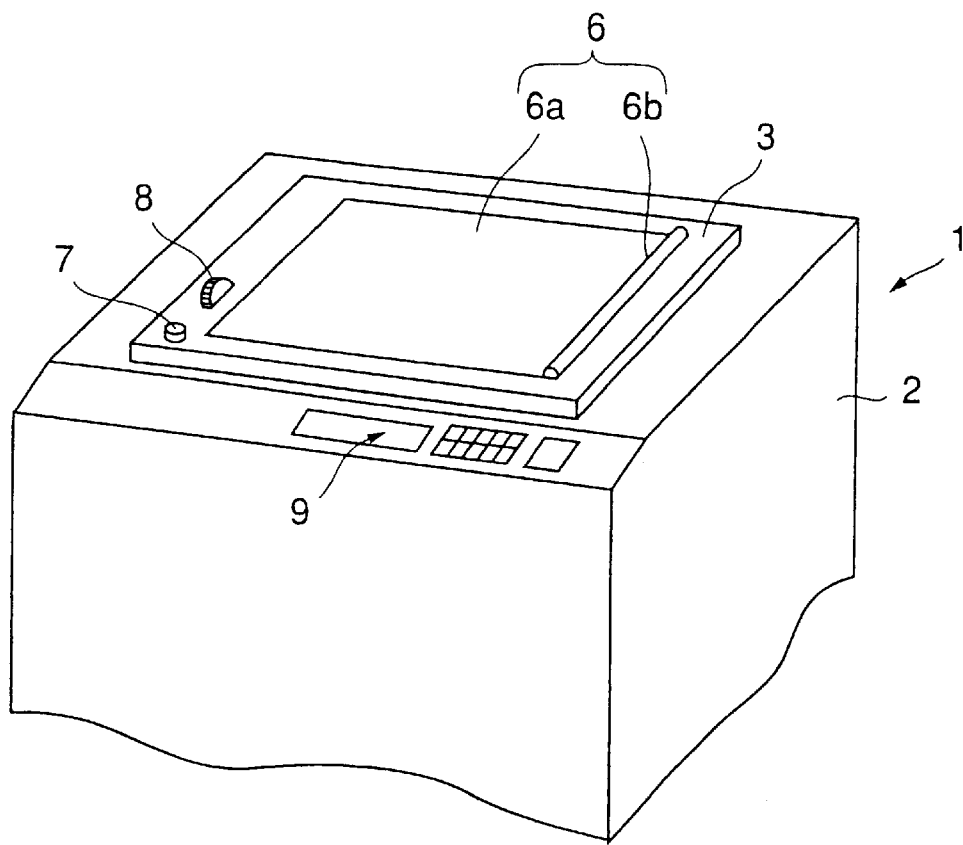
FIG. 1 is a perspective view showing an overall structure of an image reading-out apparatus according to the first embodiment of the present invention.
Figure 2:
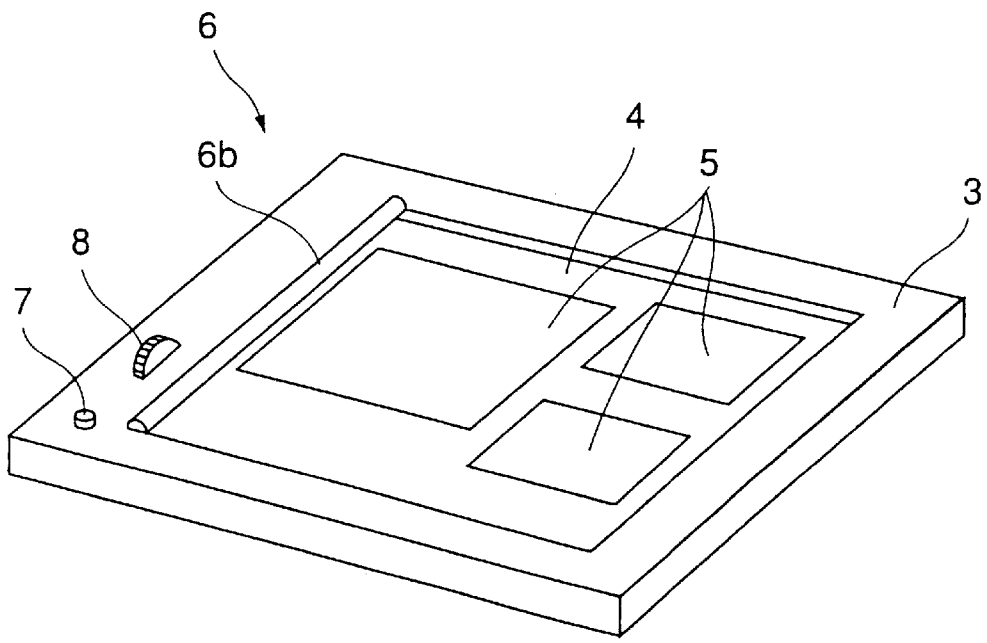
FIG. 2 is a perspective view showing a schematic structure of a large liquid-crystal display unit shown in FIG. 1.

Preferred embodiments according to the present invention will be disclosed with reference to the attached drawings. FIG. 1 is a perspective view showing an overall structure of an image reading-out apparatus according to the first embodiment of the present invention. FIG. 2 is an enlarged perspective view of an essential part of the image reading-out apparatus.

In FIGS. 1 and 2, an image forming apparatus 1 is provided with a platen cover 3 as a cover set over a main frame 2; a touch panel 4 installed in the platen cover 3; a large liquid-crystal display screen 5 having a display area equivalent to the touch panel 4; a protector 6 provided over the platen cover 3 for covering and uncovering the touch panel 4 and the large liquid-crystal display screen 5 so that they can be viewed from outside; an open/close switch 7 provided at a position around the touch panel 4 and the large liquid-crystal display screen 5, to open/close the protector 6; an angel-adjusting dial 8 for adjusting an overall inclination angle of the touch panel 4 and the large liquid-crystal display screen 5; and a main switch 9 provided at an outer edge of the platen cover 3 on the main frame 2.

FIG. 1 illustrates the platen cover 3 on which the protector 6 has been closed whereas FIG. 2 illustrates the protector 6 has been opened for use of the touch panel 4 and the large liquid-crystal display screen 5. The large liquid-crystal display screen 5 having the touch panel 4 is usually protected by the protector 6 for protecting the touch panel 4 from damage or contamination while not used.

Figure 3:
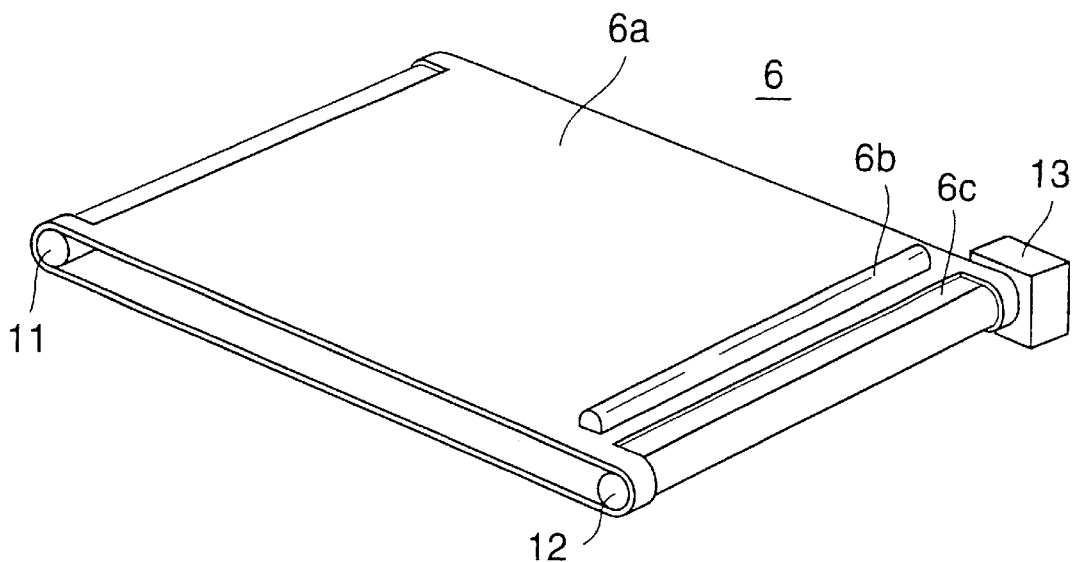
FIG. 3 is a perspective view illustrating that the display unit is covered by a protector in the image reading-out apparatus shown in FIG. 1.
Figure 4:
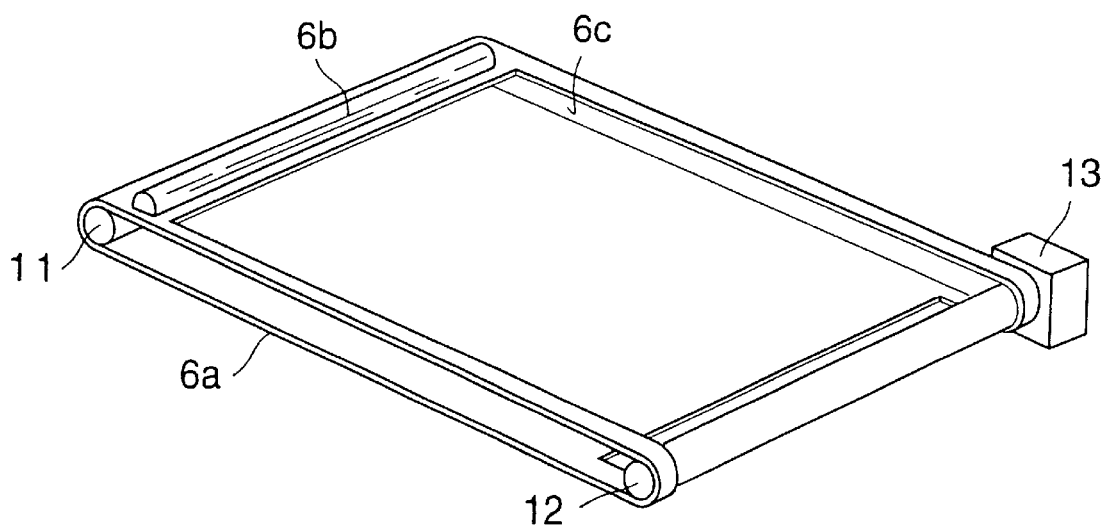
FIG. 4 is a perspective view illustrating that the protector is opened in the image reading-out apparatus shown in FIG. 1.

As illustrated in FIGS. 3 and 4, the protector 6 is an endless belt constituted by a shield 6a for blocking transmission of light; a positioning unit 6b engaged with both edges of the touch panel 4, for restricting the protector 6 in its open and shield state; and an opening 6c formed larger than the large liquid-crystal display screen 5. The protector 6 is set between two rollers 11 and 12. The roller 12 is attached to a shaft of a drive motor 13 so that it is rotated with the shaft.

The motor 13 is switched on and off by the open/close switch 7 for rotation. The open/close switch 7 is turned on to drive the motor 13 to rotate so that the positioning unit 6b is transferred from a position shown in FIGS. 1 and 3 to another shown in FIGS. 2 and 4, thus the protector 6 is switched from a state of complete shielding the touch panel 4 and the large liquid-crystal display screen 5 to another state of complete openness thereof. The large liquid-crystal display screen 5 having the touch panel 4 can be fully uncovered in use as illustrated in FIG. 2 when the protector 6 is opened by depressing the open/close switch 7.

The protector 6 is made of the endless belt with the opening 6b. The rotation-drive motor 13 is attached to one of the two rollers 11 and 12, the protector 6 being set therebetween as disclosed, thus the motor being rotated by depressing the open/close switch 7 for opening/closing. The number of rotation for the motor is, for example, pre-stored in a memory, and controlled to open/close the protector 6. A motor-rotation direction can be set so that it is switched after an opening/closing process. This setting allows the next opening/closing process for the protector 6 when the switch is depressed next time to rotate the motor in a direction that is reverse of the former direction.

Figure 5:
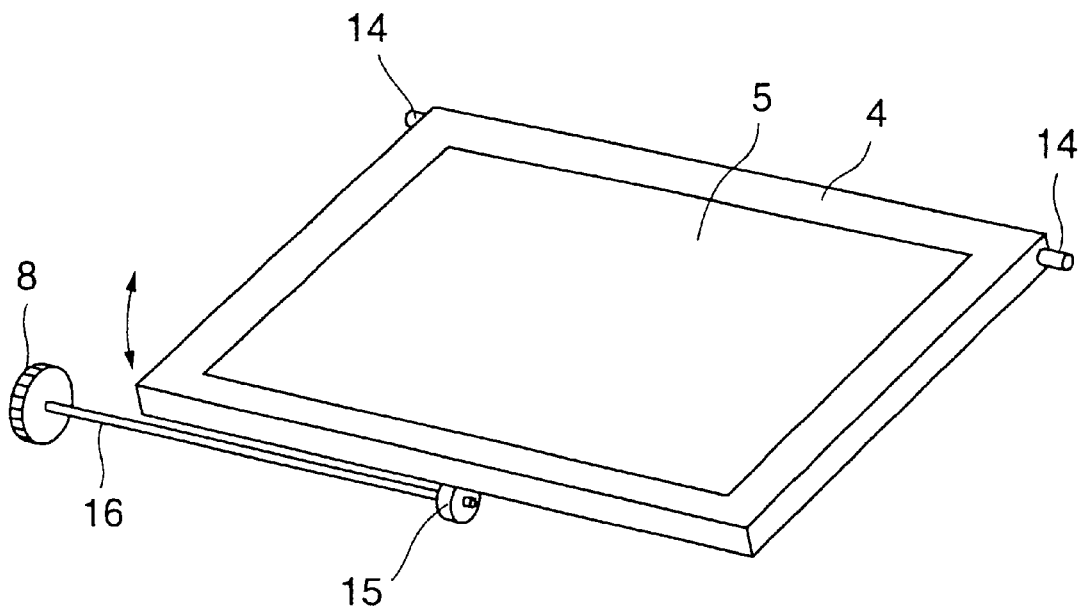
FIG. 5 is a perspective view illustrating a slant adjustment mechanism used for the display unit in the image reading-out apparatus shown in FIG. 1.
Figure 6:
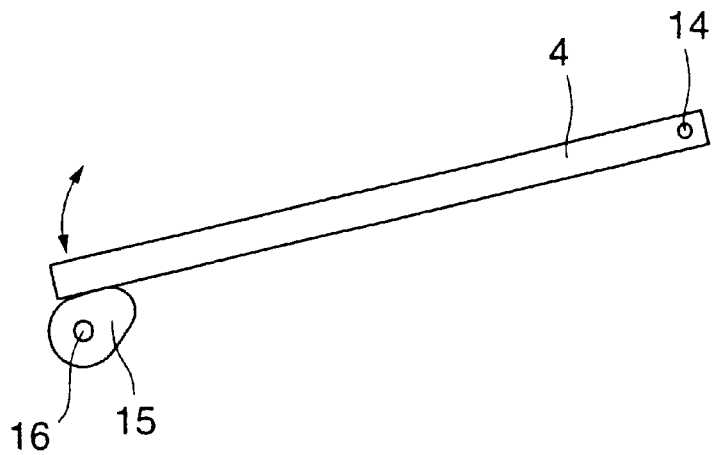
FIG. 6 is a side view illustrating an essential part of the slant adjustment mechanism used for the display unit in the image reading-out apparatus shown in FIG. 1.

The large liquid-crystal display screen 5 having the touch panel 4 has been set as inclined in accordance with a field angle of the liquid-crystal display screen for a user-friendly operation. The screen has functions of angle adjustment and also contrast and brightness adjustments, etc, for a user to watch easily. The brightness adjustment is made by voltage adjustment for a cold cathode tube in the display screen. The contrast adjustment is made by voltage adjustment for a torsion angle of liquid-crystal. Angle of inclination is adjusted by using the angel-adjusting dial 8 that is connected to an elliptical cam. Rotation of the angel-adjusting dial 8 allows rotation of the elliptical cam for angle adjustment to the large liquid-crystal display screen 5, as illustrated in FIGS. 5 and 6.

Figure 7:
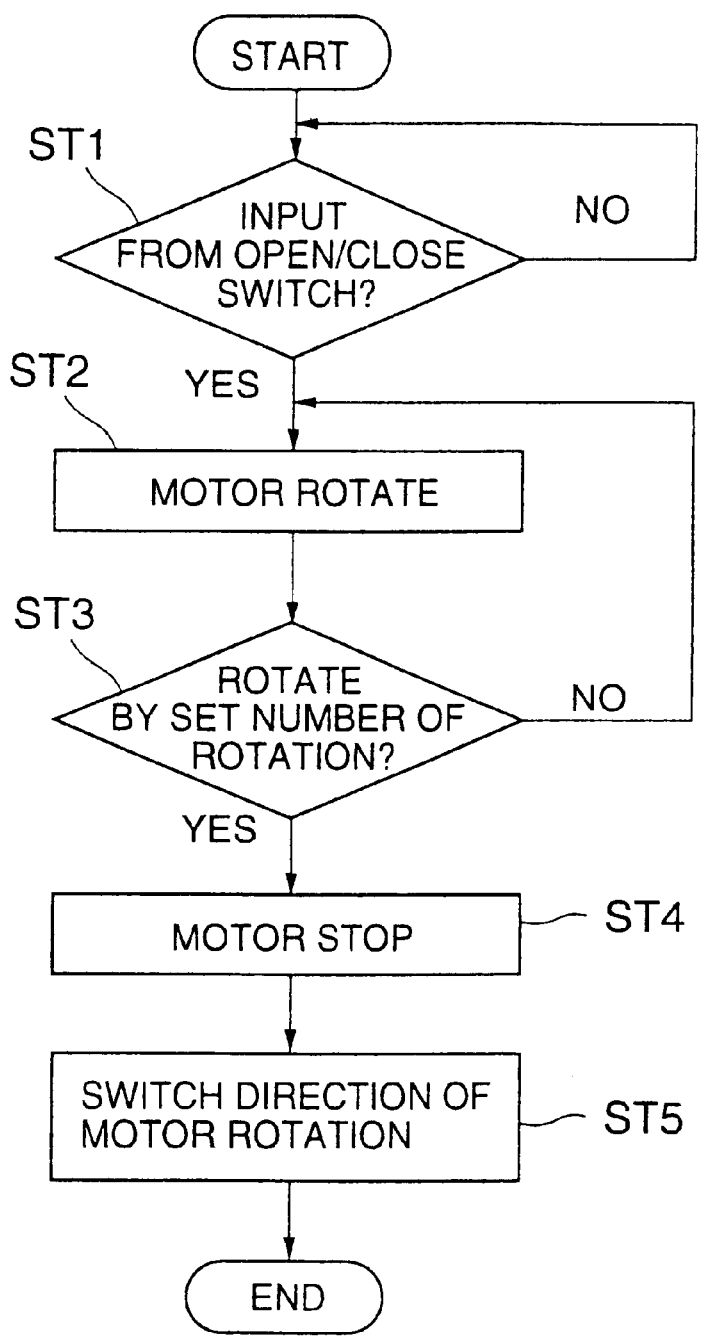
FIG. 7 is a flow chart explaining an operation of the image reading-out apparatus according to the first embodiment.

Disclosed next is an operation of an image reading-out apparatus according to the first embodiment of the present invention with reference to FIGS. 7–12. FIG. 7 is a flow chart explaining a control of a drive operation of the drive motor 13 for opening/closing the protector 6. In FIG. 7, judged in step ST1 is whether or not there is input to the open/close switch 7 for the protector 6. If there is input to the open/close switch 7, the motor 13 is rotated in either direction in step ST2. The motor 13 is rotated in a direction in which the protector 6 is opened in the initial state in which the large liquid-crystal display screen 5 has been covered by the protector 6. If there is no input to the open/close switch 7 in step ST1, the judgment in step ST1 is periodically made until the switch 7 is turned on.

After the motor has been rotated in step ST2, it is judged in step ST3 whether or not the motor has been rotated by a set number of rotation. If judged in step ST3 that the motor 13 has been rotated by the set number of rotation, the motor 13 is stopped in step ST4. If judged in step ST3 that the motor 13 has not been rotated by the set number of rotation, the process goes back to step ST2 to continue the rotation of the motor 13. When the motor 13 is stopped in step ST4, the direction of rotation of the motor 13 is switched to a reverse direction in step ST5. The protector 6 has been opened to uncover the large liquid-crystal display screen 5 as described above, hence the direction of rotation of the motor 13 is set in a direction in which the protector 6 is closed, and the process ends.

Figure 8:
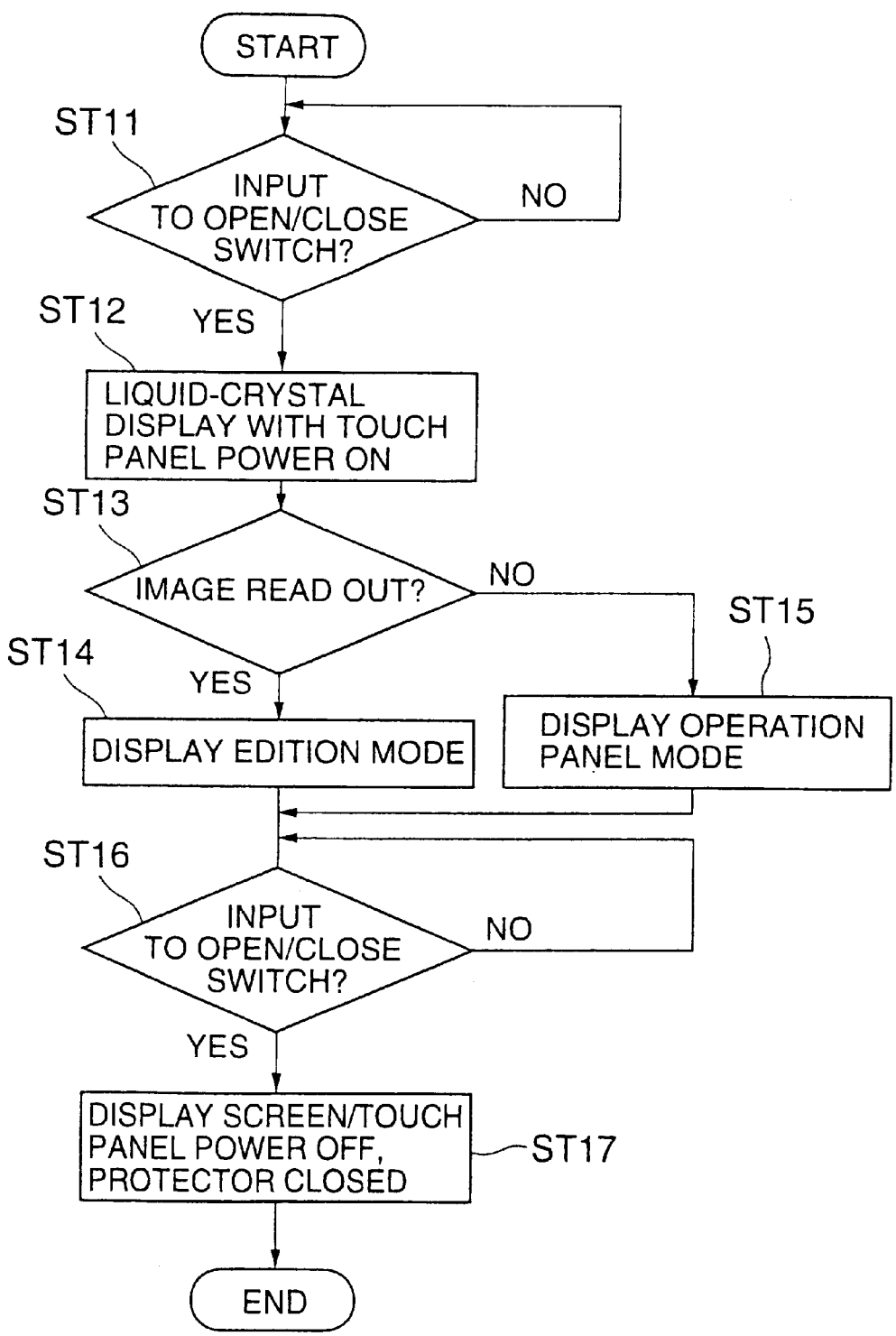
FIG. 8 is a flow chart explaining an operation of the image reading-out apparatus according to the first embodiment.

Disclosed next with reference to FIG. 8 is an operation in an image reading process for the image reading-out apparatus according to the first embodiment. In FIG. 8, judged in step ST11 is whether or not there is input to the open/close switch 7 for the protector 6. If there is input to the open/close switch 7, power is on for the large liquid-crystal display screen 5 having the touch panel 4. If there is no input to the open/close switch 7 in step ST11, this loop is repeated until input comes.

After power on for the liquid-crystal display screen 5 in step ST12, it is judged in step ST13 whether or not an image has been read out. After the image has been read out, an edition mode is displayed in step ST14. On the contrary, if the image has not been read out yet, an operation panel mode is displayed in step ST15. An operation in each mode is executed thereafter. When the operation in each mode is finished, it is judged again in step ST16 whether or not there is input to the open/close switch 7.

If judged in step ST16 that there is input the open/close switch 7, the process goes to step ST17 in which power is off for the liquid-crystal display screen 5 and the touch panel 4, and the motor 13 is driven to close the protector 6. The sequential operation as disclosed above allows the liquid-crystal display screen 5 having the touch panel 4 provided on the cover 3 of the document table to read out an image, thus providing a user-friendly image reading-out apparatus.

Disclosed next with reference to FIGS. 9 to 12 are windows displayed on the liquid-crystal display screen 5 in the process for the image reading-out apparatus that operates according to the flow charts shown in FIGS. 7 and 8. After an image has been read out, it is automatically judged as image edition when the open/close switch 7 shown in FIG. 2 is depressed. The read-out image is displayed on a large window 5a on the large liquid-crystal display screen 5, and an edition-menu 5b is displayed along the window 5a. A user can edit the document image actually read out and displayed on the large window 5a while watching the edition menu 5b displayed close to the image.

Figure 9:
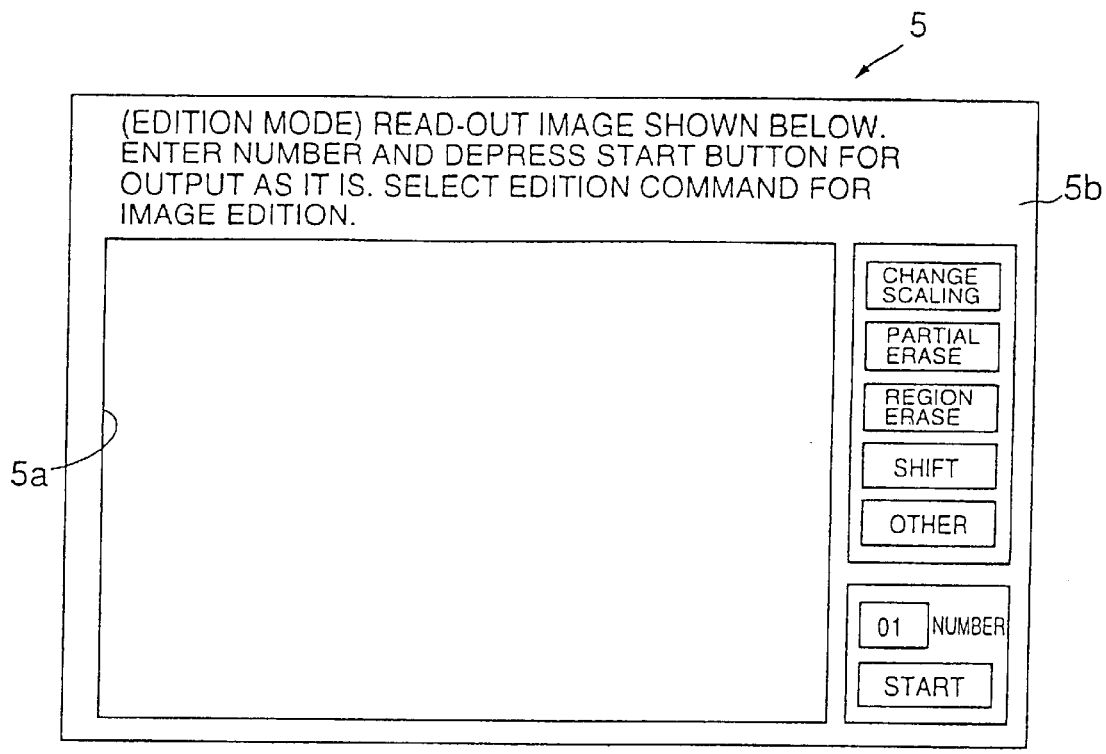
FIG. 9 is a detailed plan view of a large liquid-crystal display screen of the image reading-out apparatus according to the present invention.

As illustrated in FIG. 9, a message such as "(EDITION MODE) READ-OUT IMAGE SHOWN BELOW. ENTER NUMBER AND DEPRESS START BUTTON FOR OUTPUT AS IT IS. SELECT EDITION COMMAND FOR IMAGE EDITION." is displayed on the upper portion of the edition menu 5b. Arranged on the right side of the window 5a on which an image has been displayed are several edition command buttons, for example, "a scale-change button" for instructing change in scaling factor for an image, "a partial-erase: button" for instructing image-partial erasure, "a region-erase button" for instructing erasure of an area surrounding a main image portion, "a shift button" for instructing a shift of any portion of a read-out image from the present position to another in the window, and "other button" for changing the window to other image edition commands. Provided below the edition command buttons in the large liquid-crystal display screen 5 are a button for indicating the number of output and a start button.

Figure 10:
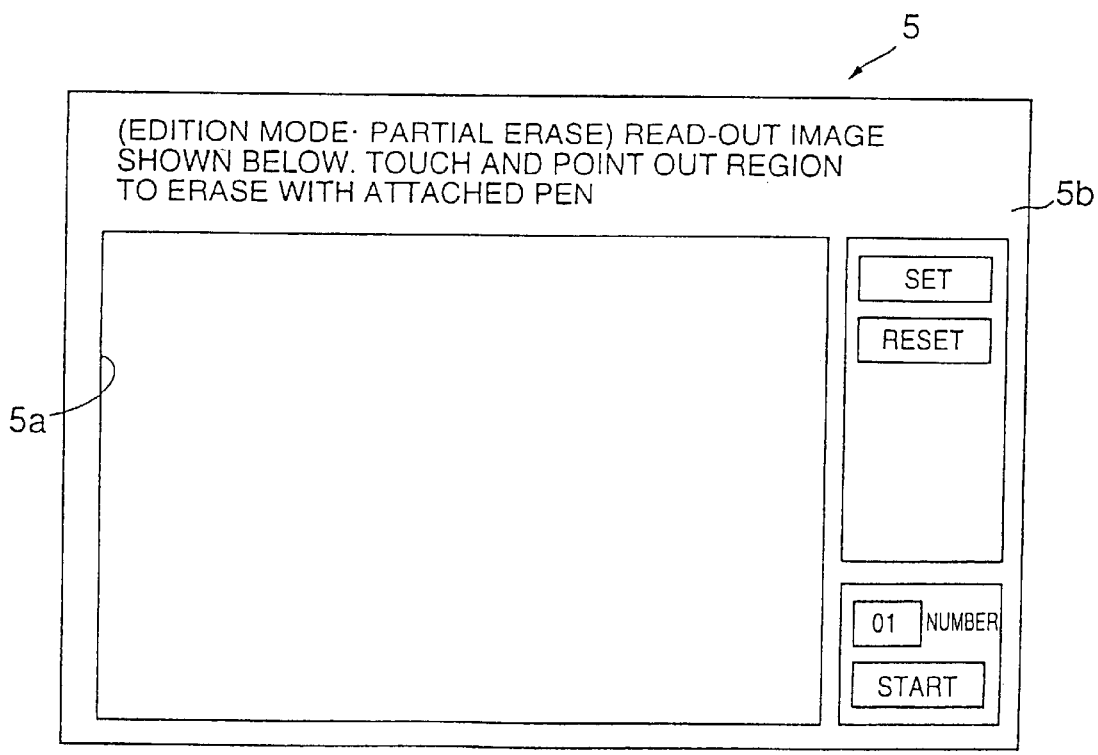
FIG. 10 is a detailed plan view of a large liquid-crystal display screen of the image reading-out apparatus according to the present invention.

When a user depresses, for example, "the partial-erase button" in the edition menu in FIG. 9, (EDITION MODE: PARTICIAL ERASURE) is displayed as illustrated in FIG. 10. A message such as "READ-OUT IMAGE SHOWN BELOW. TOUCH AND POINT OUT REGION TO ERASE WITH ATTACHED PEN." is displayed on the upper side of the screen. Arranged on the right side of the window 5a are edition command buttons "a set button" and "a reset button". A user who desires edition of partial erasure points out a region to erase with an attached touch pen, etc., and depresses the set button. If a user wants to stop the partial erasure or change the region to another, the user depresses the reset button to cancel an appointment of the region to erase.

Figure 11:
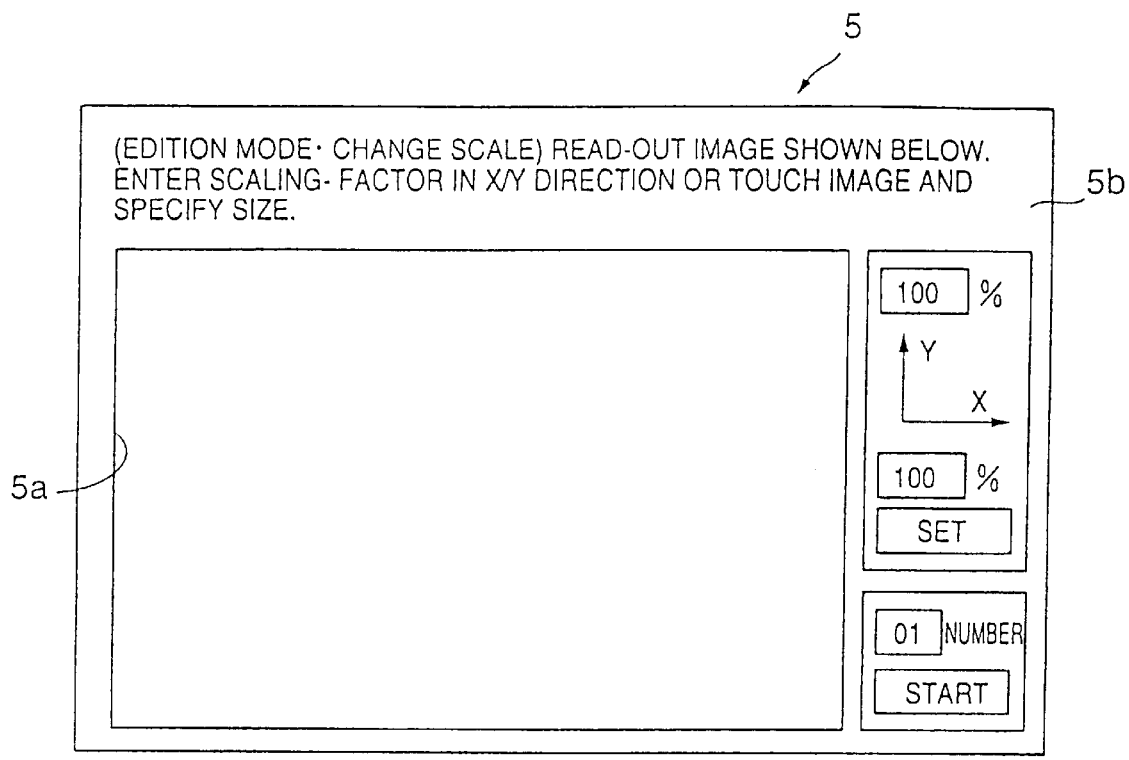
FIG. 11 is a detailed plan view of a large liquid-crystal display screen of the image reading-out apparatus according to the present invention.

In the edition menu illustrated in FIG. 9, if a user depresses, for example, the scale-change button, (EDITION MODE CHANGE SCALE) is displayed as illustrated in FIG. 11. A message such as "READ-OUT IMAGE SHOWN BELOW. ENTER SCALING-FACTOR IN X/Y DIRECTION OR TOUCH IMAGE AND SPECIFY SIZE." is displayed on the upper portion of the large window 5a. A user can enter a scaling-factor command by specifying any scaling-factor with an edition command appeared on the right side while viewing an image an actually displayed on the large window 5a.

Figure 12:
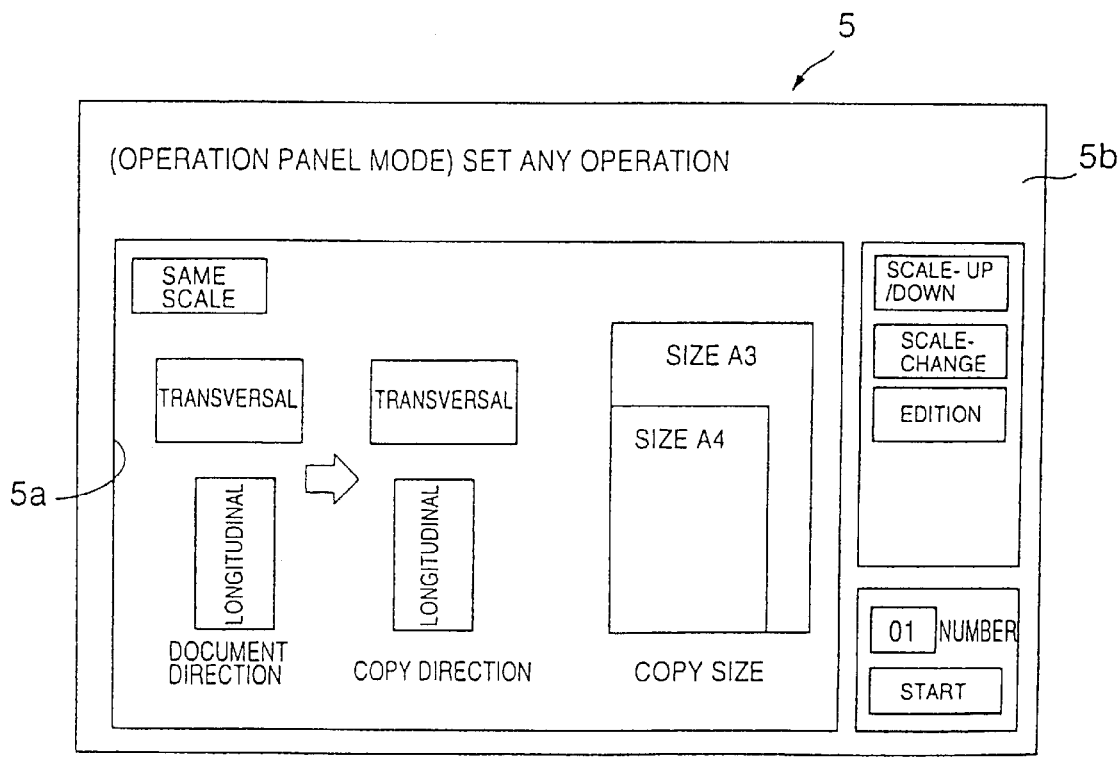
FIG. 12 is a detailed plan view of a large liquid-crystal display screen of the image reading-out apparatus according to the present invention.

On depressing the open/close switch 7 before reading the document, it is judged as a usual copying operation and a user-friendly control panel is automatically displayed as shown in FIG. 12. A user can operate an image forming apparatus such as a copy machine using this control panel displayed on the large liquid-crystal display screen. Displayed on the liquid-crystal display screen 5 is "OPERATION PANEL MODE" with a message "SET ANY OPERATION." as shown in FIG. 12. Displayed on the large window 5a are operation icons such as a scaling-factor for copy, a direction of document and copy size.

Provided on the right side of the window 5a are edition commands such as a "scaling-up/down" button, a "scale-change" button and "edition" button. The "scale-change" button or the liquid-crystal display screen 5; the touch panel 4 for data entry, and the liquid-crystal display (LCD) screen 5 for displaying image data or a friendly-control panel by using the window 5a, etc.

The system bus 16 is a control bus for the overall system, to control the basic system unit 20, the image processor 26, the data memory 29 as the memory unit, the input/output unit 30, and the cover 30 as the large liquid-crystal display screen having the touch panel. The image bus 17 is used only for image data and capable of high-speed transfer of image data between the image processor 26, the data memory 29 as the memory unit, input/output unit 30 and the cover 30 as the large liquid-crystal display screen having the touch panel.

This control system performs the control operations for the image reading-out apparatus according to the first embodiment disclosed with reference to FIGS. 1 to 12, and also control operations for the image reading-out apparatus according to the second embodiment and the third embodiment which will be disclosed with reference to FIGS. 14 to 16, and 17 and 18, respectively.

The image reading-out apparatus according to the first embodiment disclosed above is a type of image reading-out apparatus having the shielding cover 3 provided on the document table. Not only this, the present invention is applicable, for example, to an image reading-out apparatus according to the second embodiment shown in FIGS. 14 to 16, in which an automatic document feeder (termed ADF hereinafter) is attached on the image reading-out apparatus.

Figure 14:
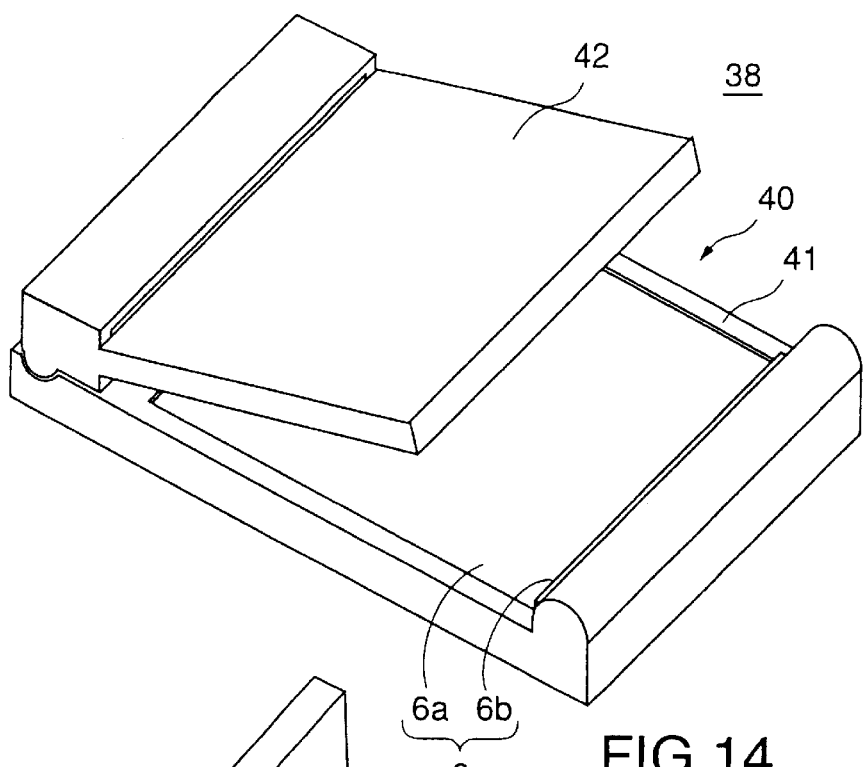
FIG. 14 is a perspective view of an essential part of an image reading-out apparatus according to the second embodiment of the present invention applied to an automatic document feeder.

In FIG. 14, an image reading-out apparatus 38 according to the second embodiment, is provided with an ADF 40 which is equipped with an ADF body 41 functioning as a document discharge table; a document inserter 42 used as a document tray for automatically feeding a document onto a glass board of a document table (not shown); and a protector 6 for protecting a large liquid-crystal display screen having a touch panel (not shown in FIG. 14) attached to the ADF body 41. The large liquid-crystal display screen having a touch panel (not shown in FIG. 14) is usually covered by the protector 6 so that the touch panel is not damaged while discharging a document in use of ADF. A stopper "edition" button is depressed to switch this screen with the edition-mode screen or the edition-mode/scale-change screen shown in FIGS. 9 and 11, respectively. A user can output an image as it is after checking an output image quality with no edition operation and also with no displaying a post-edited output image. When a user depresses the open/close button 7 after using the large liquid-crystal display screen having the touch panel, the display screen is power-off and the drive motor 13 is simultaneously driven to close the protector 6.

Figure 13:
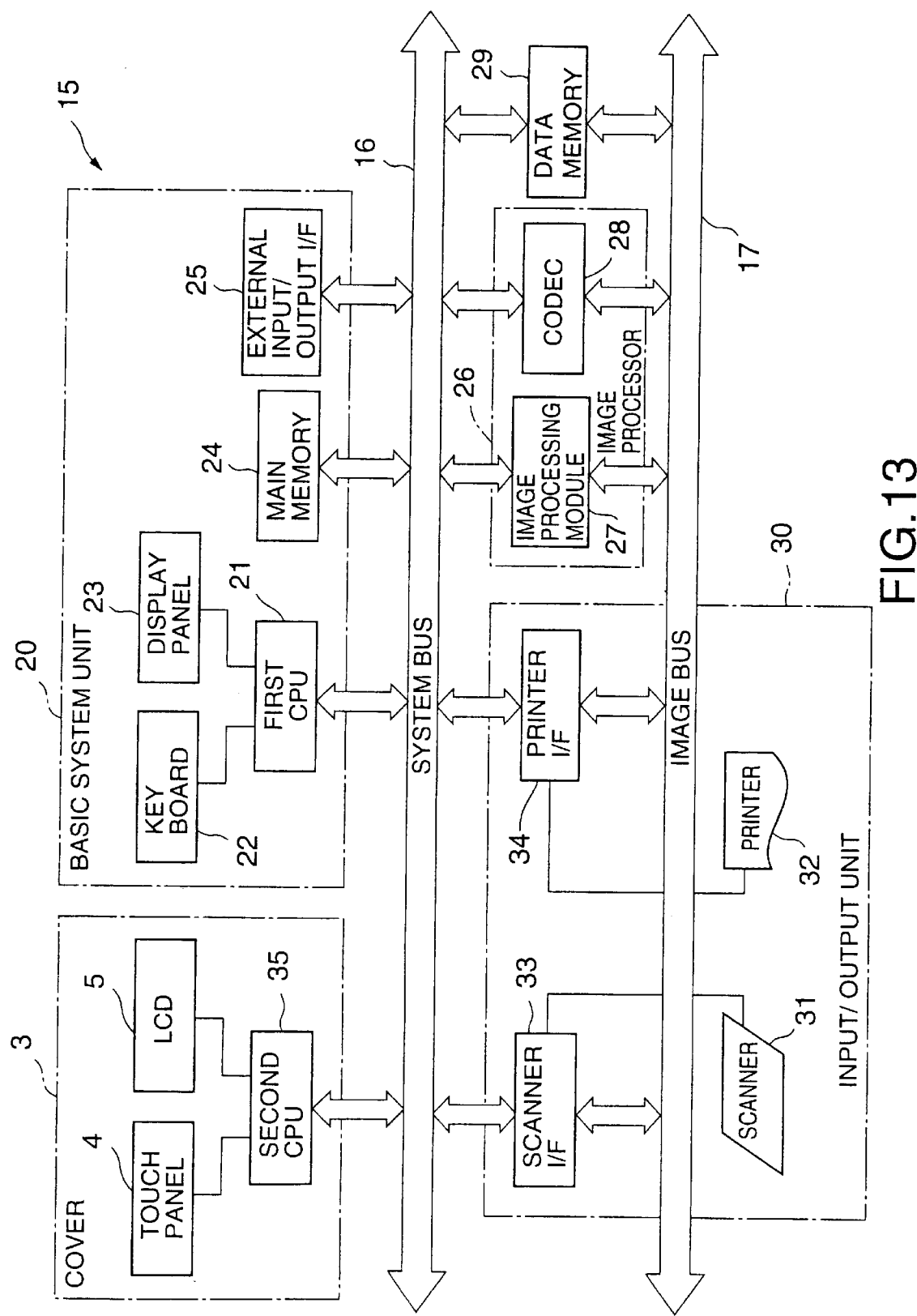
FIG. 13 is a block diagram of a system of the image reading-out apparatus according to the present invention.

Disclosed next with reference to FIG. 13 is a basic structure of a control system applied to an image reading-out apparatus according to the present invention. In FIG. 13, a control system 15 is basically provided with a system bus 16; an image bus 17; a basic system unit 20; an image processor 26; a data memory 29 as a memory unit; an input/output unit 30; and a large liquid-crystal display screen 3 having a touch panel.

The basic system unit 20 is provided with a first CPU 21 for several controls; a key board 22 for data entry; a display panel 23 on the control panel for displaying several states; a main memory 24 for storing a control program for the overall system, etc.; and an external input/output interface 25 for connection of external equipment.

The image processor 26 is provided with an image processing module 27 for performing several image processing and an image data compression/decompression processor (CODEC) 28. The data memory 29 as a memory unit is a data memory having a page memory and a buffer memory.

The input/output unit 30 is provided with an image reading scanner 31 for optically reading image data such as document information and transferring it to a time-series electrical signal; an image printer 32 as image output unit for printing-out the image data; a scanner interface 33 for connecting the scanner 31, the printer 32 and the basic system unit 20 via the system bus 16; and a printer interface 34. The cover 3 as the large liquid-crystal display screen having the touch panel 4 is provided with a second CPU 35 for performing several controls for data-entering via the touch panel 4 and display control for the 6b attached to the tip of the protector 6 is located just under the document outlet so as to avoid collision with a discharged document.

Figure 15:
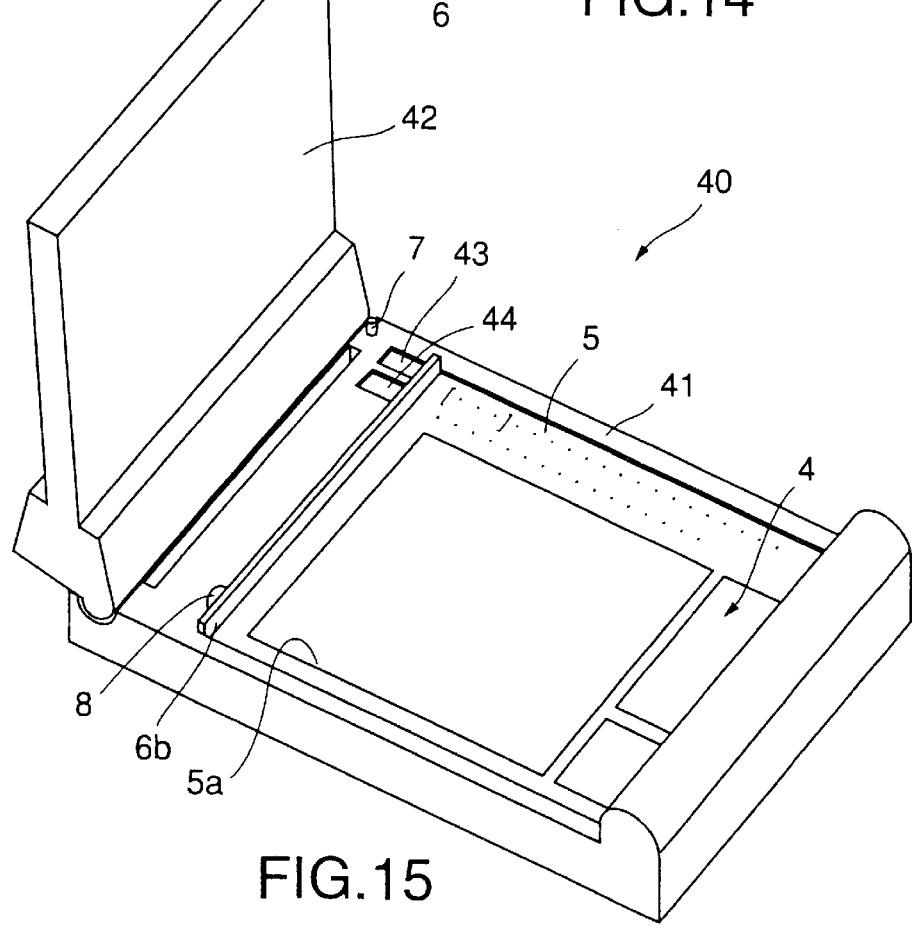
FIG. 15 is a perspective view illustrating a flipped-up state of a document table of the automatic document feeder shown in FIG. 14.

The ADF body 41 is provided with a large liquid-crystal display screen having a touch panel 4 as shown in FIG. 15. The touch panel 4 and the large liquid-crystal display screen 5 basically have almost the same structure as those for the image reading-out apparatus according to the first embodiment shown in FIG. 2. In FIG. 15, the large liquid-crystal display screen 5 having the touch panel 4 is set on the body 41. In use, the document inserter 42 of the ADF 40 is flipped up towards left in the drawing. Flipping-up the document inserter 42 of the ADF 40 turns on the open/close switch 7 for the liquid-crystal display and the protector 6, so that an image is displayed on the large liquid-crystal display screen 5 having the touch panel 4, and the protector 6 for the large liquid-crystal display screen 5 having the touch panel 4 is automatically housed in the case when the switch 7 is on so that the large liquid-crystal display screen 5 appears.

As illustrated in FIG. 15, the large liquid-crystal display screen 5 having the touch panel 4 appears on release of the protector 6. Like shown in FIG. 2, the liquid-crystal display screen 5 is provided with a large window 5a, operation menu windows, etc. Arranged along with the liquid-crystal display screen 5 are a dial 8 for slant adjustment, a contrast adjustment button 43, a brightness adjustment button 44, etc. The liquid-crystal display screen 5 having the touch panel 4 has been set as inclined according to its field angle so that a user easily operate, like the first embodiment. In addition to the dial 8 for angle adjustment, the second embodiment is provided with the button 43 for contrast adjustment and the button 44 for brightness adjustment for further angle adjustment to the liquid-crystal display screen 5, thus achieving further easy user edition operation with these functions.

Figure 16:
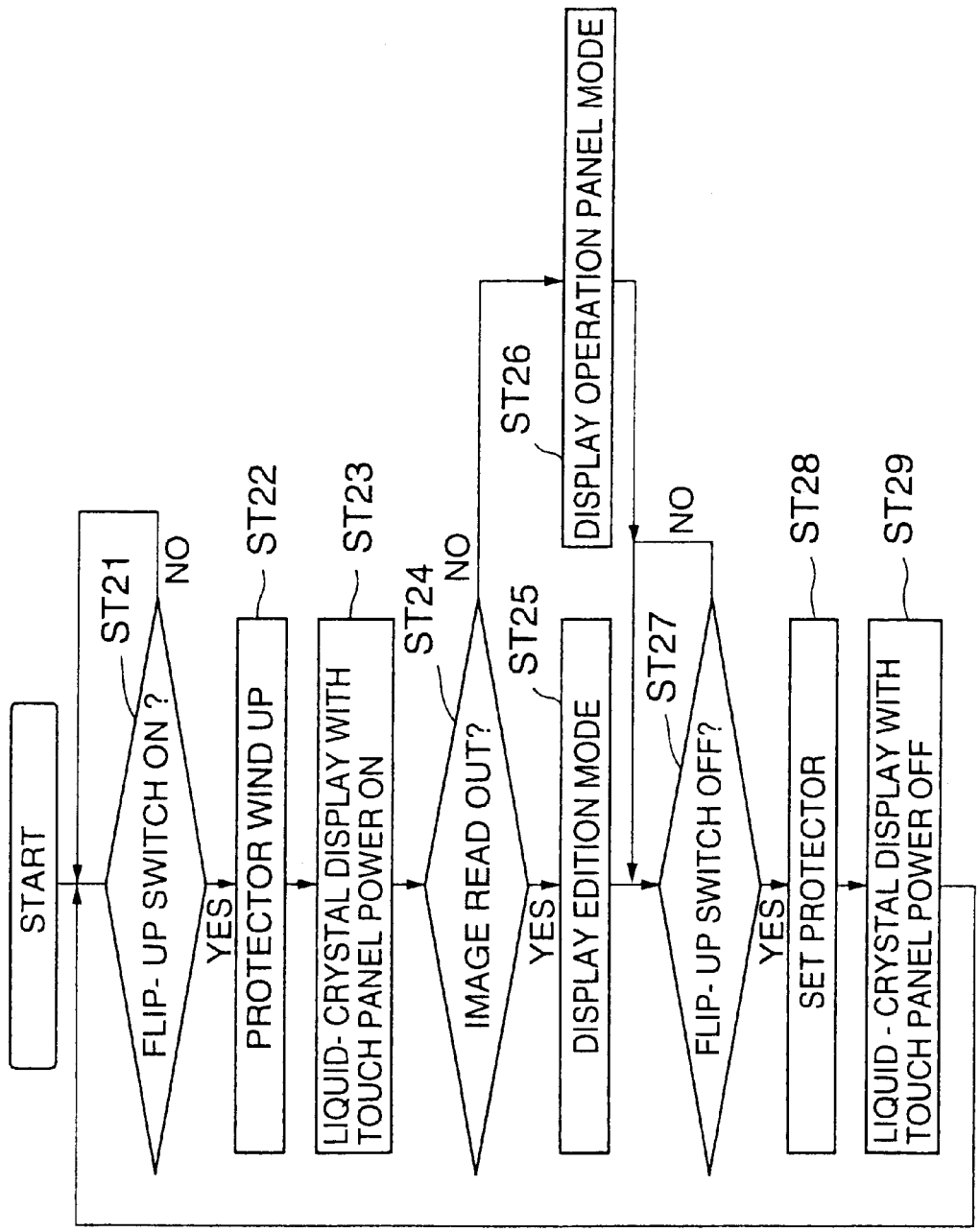
FIG. 16 is a flow chart explaining an operation of the image reading-out apparatus according to the second einbodiment.

An operation of the image reading-out apparatus according to the second embodiment having the structure described above is disclosed in detail with reference to FIG. 16. It is judged in step ST21 whether or not the switch 7 has been on, which is turned on when the document inserter 42 is flipped up. If judged in step ST21 that the switch 7 is on, the process goes to step ST22 for a winding-up operation to the protector 6. In step ST23, power is on for the liquid-crystal display screen 5 having the touch panel 4, and it is judged in step ST24 whether or not an image has been read-out.

If judged in step ST24 that the image has been read-out, an edition mode is displayed in step ST25. If judged in step ST24 that the image has not been read-out yet, the process goes to step ST26 to display an operation panel-display mode. In step ST27, it is judged that the flip-up switch 7 has been off. If judged that the flip-up switch 7 has been off in step ST27, the protector 6 is closed to protect the large liquid-crystal display screen 5 in step ST28. If judged that the flip-up switch 7 has not been off in step ST27, the judgement routine is repeated until the flip-up switch 7 is judged as being off.

When the protector 6 is closed in step ST28, power is off for the liquid-crystal display screen 5 having the touch panel 4 in step ST29 to halt the operations of the touch panel 4 and the liquid-crystal display screen 5. It is apparent from this process that when the document inserter 42 of the ADF 40 is flipped up after an image has been read out, a mode is judged as an image edition mode to display the image that has been read out, so that a user performs an edition operation to the document image that has actually been read out while the edition menu is appearing. Not only the edition operation, a user can display an output image after edition, check an image quality for copy with no edition, etc.

When the document inserter of the ADF is flipped up in left side before a document is read out, it is judged as a usual copying operation to display a user-friendly control panel. A user can operate a copy machine through the control panel. On returning the document inserter of the ADF to its initial state after a user has used the large liquid-crystal display screen having the touch panel, power is off for the large liquid-crystal display screen having the touch panel via switch and simultaneously the protector 6 is closed.

In the image reading-out apparatus according to the second embodiment, the large liquid-crystal display screen 5 having the touch panel 4 is set as being inclined according to its filed angle for a user to easy use, and also provided with functions such as angle adjustment, contrast adjustment and brightness adjustment, thus achieving further user friendly operation.

On returning the document inserter 42 of the ADF 40 to its initial state after a user has used the large liquid-crystal display screen 5 having the touch panel 4 for edition, etc., the protector 6 is closed and simultaneously power is off via the switch 7, thus the present invention offering advantages in preventing the protector from being not closed accidentally or power being not off accidentally for the touch panel and the liquid-crystal display screen.

Although not shown in FIGS. 14 to 16, the structures shown in FIGS. 1 to 15 for the first embodiment are applicable to the second embodiment. An image reading-out apparatus according to the third embodiment is basically illustrated in FIGS. 17 and 18. Like the second embodiment, for some elements that are not shown in these drawings, the corresponding elements shown in FIGS. 1 to 15 can be used.

Figure 17:
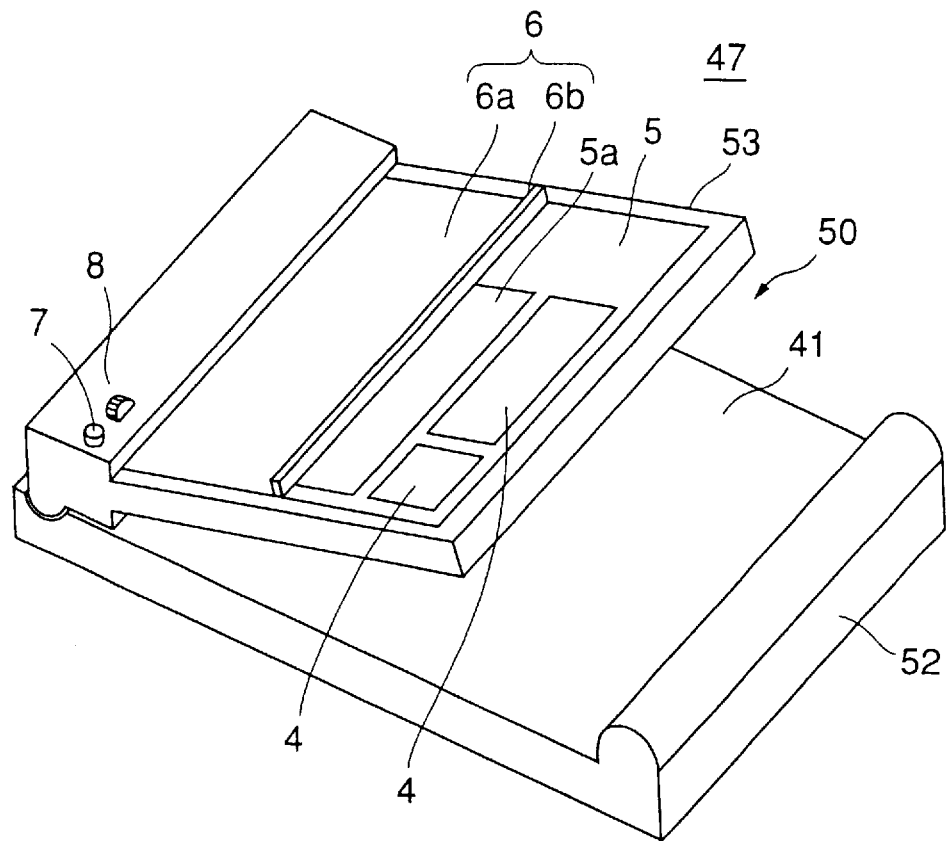
FIG. 17 is a perspective view illustrating an essential part of an image reading-out apparatus according to the third embodiment of the present invention.
Figure 18:
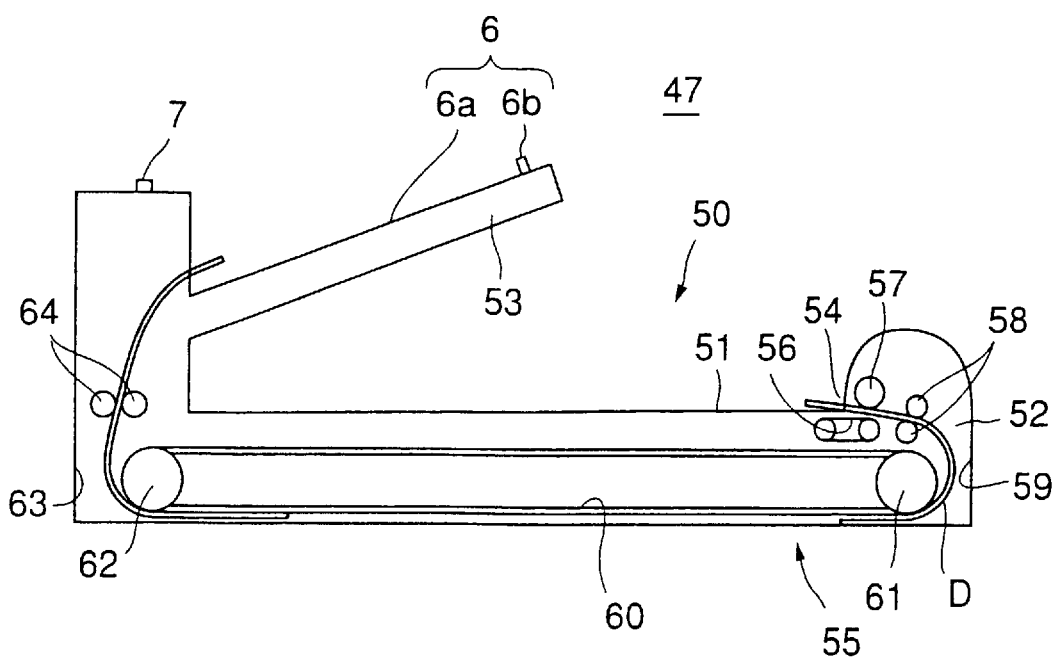
FIG. 18 is a schematic sectional view of image reading-out apparatus of FIG. 17. structure, the document feeding tray provided at an upper stage of the automatic document feeding mechanism may be set as inclined to the document discharging tray provided at a lower stage of the automatic document feeding mechanism, and, if not used, flipped up from the document discharging tray, the open/close switch being turned on for opening/closing the protector when the document feeding tray is flipped up to automatically open the protector.

In FIG. 17, an image reading-out apparatus 47 according to the third embodiment is basically provided with an automatic document feeder (ADF) 50, like the second embodiment. The ADF 50 has a structure that is reverse of the usual ADF 40 illustrated in FIG. 14 according to the second embodiment. In other words, as illustrated in FIG. 14, usually, the document inserter 42 is set upwards and the document discharging tray is set under the inserter, contrary to this, in the image reading-out apparatus according to the third embodiment, the document feeding tray 51 is set at the ADF body 52 side and a document discharging tray 53 is set at the document inserter 42 shown in FIG. 14.

As illustrated in FIG. 17, provided on the document discharging tray 53 is a hinged protector 6 under which a large liquid-crystal display screen 5 having a touch panel 4 will appear when the protector is opened. FIG. 17 illustrates the protector 6 on the way to an opened state or a closed state. Like the first and the second embodiments, the protector 6 is provided with a shield 6a and a stopper 6b. The protector 6 is opened or closed via the open/close switch 7. The switch 7 can be used for power on or off for the large liquid-crystal display 5 screen.

The liquid crystal display screen 5 is provided with a slant adjustment mechanism like the first and the second embodiments. The slant adjustment is performed by using a adjustment dial 8. A detailed structure of the slant adjustment mechanism is the same as that illustrated in FIGS. 5 and 6 and the corresponding disclosure. The liquid crystal display screen 5 is provided with a large window 5a, attached along with the window 5a being a touch panel 4 arranged thereon being several touch buttons on an edition menu. Although not shown in FIG. 17, the image reading-out apparatus according to the third embodiment is provided with a brightness adjustment means and a contrast adjustment means like the image reading-out apparatus according to the second embodiment. Explanation for those means is omitted here because their detailed structures are illustrated in FIG. 15.

In the image reading-out apparatus according to the third embodiment, several sheets of document D set on a document feeding-side tray 51 are taken into a document inlet by an automatic feeding mechanism 55 and conveyed onto the right side of the drawing by an intake belt 56. After conveyed, a sheet of the document D is taken out by a separation roller 57 from the bottom of the document D. One sheet of the document taken out by the intake belt 56 and the separation roller 57 is conveyed to a conveyance belt 60 along a conveyance guide 59 through a pair of conveyance rollers 58. The conveyance belt 60 is set between two rollers 61 and 62. One sheet of document D is conveyed from right to left in the drawing while the two rollers 61 and 62 are rotating in a clockwise direction.

The document is once stopped on a document table glass while a reading-out scanner is scanning the image of the document. On completion of image reading-out, the document is conveyed again from right to left in the drawing while the two rollers 61 and 62 are rotating in the clockwise direction. The document is conveyed along the conveyance guide 63 onto an upper document discharging-side tray 53 through a pair of rollers 64. The touch panel 4 and the large liquid-crystal display screen 5 arranged on the document discharging-side tray 53 are protected by the protector 6 while the document D is being read-out as an image.

After an image has been read-out from the document D, an open/close switch 7 provided on the document discharging-side tray 53 is depressed to release the protector 6. The release allows operations of the large liquid-crystal display screen 5 and the touch panel 4. The adjustment dial 8 is turned to operate the mechanism shown in FIGS. 5 and 6 to adjust an angle of the liquid-crystal display screen 5 if a field angle, etc., thereof is not suitable for a user. The succeeding operation of the image reading-out apparatus 47 is executed according steps, for example, like those shown in FIG. 8 for the image reading-out apparatus according to the first embodiment.

In the image reading-out apparatus according to the third embodiment, the large liquid-crystal display screen 5 having the touch panel 4 is not provided on the cover 3 for shielding the document table glass or the document discharge-side tray 41 provided just on the document table like the apparatus according to the first and the second embodiments, but provided on the document discharging tray 53 as an ADF-upper side tray. Thus, an operator can further easily watch an image on screen for a friendly operation.

As disclosed above, according to the present invention, the image reading-out apparatus is provided with a large liquid-crystal display screen having a touch panel that is positioned so that an operator can easily watch and operate for edition, for example, while displaying an image read from a document on the large liquid-crystal display screen. Therefore, an operator can perform edition while checking the details of the read-out image, and also enter an operation command while displaying an operation menu on the large liquid-crystal display screen, thus markedly improving operability.

What is claimed is:

1. An image reading-out apparatus provided at least with a document table made of a transparent material that passes an image reading light beam and having a flat surface on which a document can be set and a cover that presses the document set on the document table and prevents the image reading light beam from leakage, the apparatus comprising a display/edition unit that included:

a display section having a large area for displaying an image that has been read-out via the image; a command entering section for entering an edition operation command by a touch to the read-out image displayed on the display section and a control section that controls displaying of the read-out image and the edition operation command and entering of the edition operation command by a touch, the display/edition unit being provided at a position so as not to obstruct the cover from depressing the document and preventing the image reading light beam from leakage, wherein the display/edition unit is shaped in a rectangle to cover a glass board that forms the document table set on an image forming apparatus and is formed of a flat cover that is hinged on one upper leg of the rectangle, the display section being constructed of a large liquid-crystal display screen set on the cover, and the command entering section being constructed of a touch panel set on the large liquid-crystal display screen, wherein the display/edition unit includes a protector that protects a surface of the large liquid-crystal display screen and has an open/close function of shielding or opening the large liquid-crystal display screen according to need, wherein the protector is formed of an endless belt having a shield portion for obstructing light beam from passing therethrough, a positioning portion engaged with an edge and another edge of the touch panel to restrict an open state and a shield state, and an opening portion larger than the large liquid-crystal display screen, the protector being set between a first roller and a second roller, an output shaft of the drive motor being fixed at one of the rollers to rotate with the roller.

2. An image reading-out apparatus provided at least with a document table made of a transparent material that passes an image reading light beam and having a flat surface on which a document can be set and a cover that presses the document set on the document table and prevents the image reading light beam from leakage, the apparatus comprising a display/edition unit that included:

a display section having a large area for displaying an image that has been read-out via the image; a command entering section for entering an edition operation command by a touch to the read-out image displayed on the display section; and a control section that controls displaying of the read-out image and the edition operation command and entering of the edition operation command by a touch, the display/edition unit being provided at a position so as not to obstruct the cover from depressing the document and preventing the image reading light beam from leakage, wherein the display/edition unit is shaped in a rectangle to cover a glass board that forms the document table set on an image forming apparatus and is formed of a flat cover that is hinged on one upper leg of the rectangle, the display unit being constructed of a large liquid-crystal display screen set on the cover, and the command entering section being constructed of a touch panel set on the large liquid-crystal display screen, and wherein the large liquid-crystal display screen having the touch panel includes a slant angle adjustment mechanism having a rotary supporting shaft for supporting both edges of a leg of the large liquid-crystal display screen, an elliptic cam provided rear side of another leg against the one leg at which the rotary supporting shaft is attached and an angle adjustment dial fixed at a rotary shaft for rotating the elliptic cam, for adjusting the elliptic cam while rotating.

3. An image reading-out apparatus provided at least with a document table made of a transparent material that passes an image reading light beam and having a flat surface on which a document can be set and a cover that presses the document set on the document table and prevents the image reading light beam from leakage, the apparatus comprising a display/edition unit that included:

a display section having a large area for displaying an image that has been read-out via the image; a command entering section for entering an edition operation command by a touch to the read-out image displayed on the display section; and a control section that controls displaying of the read-out image and the edition operation command and entering of the edition operation command by a touch, the display/edition unit being provided at a position so as not to obstruct the cover from depressing the document and preventing the image reading light beam from leakage, wherein the display/edition unit is shaped in a rectangle to cover a glass board that forms the document table set on an image forming apparatus and is formed of a flat cover that is hinged on one upper leg of the rectangle, the display unit being constructed of a large liquid-crystal display screen set on the cover, and the command entering section being constructed of a touch panel set on the large liquid-crystal display screen, and wherein the display/edition unit includes a protector that protects a surface of the large liquid-crystal display screen and has an open/close function of shielding or opening the large liquid-crystal display screen according to need, wherein the apparatus further includes an open/close switch provided along the large liquid-crystal display screen, for switching the protector to open or close, and wherein the open/close switch is also used as a switch for power-on or power-off for the large liquid-crystal display screen and the touch panel.

4. An image reading-out apparatus provided at least with a document table made of a transparent material that passes an image reading light beam and having a flat surface on which a document can be set and a cover that presses the document set on the document table and prevents the image reading light beam from leakage, the apparatus comprising a display/edition unit that included:

a display section having a large area for displaying an image that has been read-out via the image; a command entering section for entering an edition operation command by a touch to the read-out image displayed on the display section; and a control section that controls displaying of the read-out image and the edition operation command and entering of the edition operation command by a touch, the display/edition unit being provided at a position so as not to obstruct the cover from depressing the document and preventing the image reading light beam from leakage, wherein the display/edition unit is constructed of an automatic document feeder mechanism shaped in a rectangle to cover a glass board that forms the document table set on an image forming apparatus and hinged on one upper leg of the rectangle having an upper document feeding tray and a lower document discharging tray, the display unit being constructed of a large liquid-crystal screen display screen set at an upper stage of the automatic document feeding mechanism, and the command entering section being constructed of a touch panel set on the large liquid-crystal display screen.

5. The image reading-out apparatus according to claim 4, wherein the display/edition unit includes a protector that protects a surface of the large liquid-crystal display screen and has an open/close function of shielding or opening the large liquid-crystal display screen according to need.

6. The image reading-out apparatus according to claim 5 wherein the protector is formed of an endless belt having a shield portion for obstructing light from passing therethrough, a positioning portion engaged with an edge and another edge of the touch panel to restrict an open state and a shield state, and an opening portion larger than the large liquid-crystal display screen, the protector being set between a first and a second roller, an output shaft of a drive motor being fixed at one of the rollers to rotate with the roller.

7. The image reading-out apparatus according to claim 5 further including an open/close switch provided along the large liquid-crystal display screen, for switching the protector to open or close.

8. The image reading-out apparatus according to claim 7, wherein the open/close switch is also used as a switch for power-on or -off for the large liquid-crystal display screen and the touch panel.

9. The image reading-out apparatus according to claim 7, wherein the document feeding tray provided at an upper stage of the automatic document feeding mechanism is set as inclined to the document discharging tray provided at a lower stage of the automatic document feeding mechanism, and, if not used, flipped up from the document discharging tray, the open/close switch being turned on for opening/closing the protector when the document feeding tray is flipped up to automatically open the protector.

10. The image reading-out apparatus according to claim 4, wherein the large liquid-crystal display screen having the touch panel includes a slant angle adjustment mechanism having a rotary supporting shaft for supporting both edges of a leg of the large liquid-crystal display screen, an elliptic cam provided rear side of another leg against the one leg at which the rotary supporting shaft is attached and an angle adjustment dial fixed at a rotary shaft for rotating the elliptic cam, for adjusting the elliptic cam while rotating.

11. An image reading-out apparatus provided at least with a document table made of a transparent material that passes an image reading light beam and having a flat surface on which a document can be set and a cover that presses the document set on the document table and prevents the image reading light beam from leakage, the apparatus comprising a display/edition unit that included:

- a display section having a large area for displaying an image that has been read-out via the image a command entering section for entering an edition operation command by a touch to the read-out image displayed on the display section; and a control section that controls displaying of the read-out image and the edition operation command and entering of the edition operation command by a touch,
- the display/edition unit being provided at a position so as not to obstruct the cover from depressing the document and preventing the image reading light beam from leakage,
- wherein the display/edition unit is constructed of an automatic document feeder mechanism shaped in a rectangle to cover a glass board that forms the document table set on an image forming apparatus and hinged on one upper leg of the rectangle having a lower document feeding tray and an upper document discharging tray,
- the display unit being constructed of a large liquid-crystal screen display screen set at an upper stage of the automatic document feeding mechanism, and the command entering section being constructed of a touch panel set on the large liquid-crystal display screen.

12. The image reading-out apparatus according to claim 11, wherein the display/edition unit includes a protector that protects a surface of the large liquid-crystal display screen and has an open/close function of shielding or opening the large liquid-crystal display screen according to need.

13. The image reading-out apparatus according to claim 12 wherein the protector is formed of an endless belt having a shield portion for obstructing light from passing therethrough, a positioning portion engaged with an edge and another edge of the touch panel to restrict an open state and a shield state, and an opening portion larger than the large liquid-crystal display screen, the protector being set between a first and a second roller, an output shaft of a drive motor being fixed at one of the rollers to rotate with the roller.

14. The image reading-out apparatus according to claim 12 further including an open/close switch provided along the large liquid-crystal display screen, for switching the protector to open or close.

15. The image reading-out apparatus according to claim 14, wherein the open/close switch is also used as a switch for power-on or -off for the large liquid-crystal display screen and the touch panel.

16. The image reading-out apparatus according to claim 11, wherein the large liquid-crystal display screen having the touch panel includes a slant angle adjustment mechanism having a rotary supporting shaft for supporting both edges of a leg of the large liquid-crystal display screen, an elliptic cam provided rear side of another leg against the one leg at which the rotary supporting shaft is attached and an angle adjustment dial fixed at a rotary shaft for rotating the elliptic cam, for adjusting the elliptic cam while rotating.

* * * * *